United States Patent
Matsui

(10) Patent No.: US 11,523,020 B2
(45) Date of Patent: Dec. 6, 2022

(54) INFORMATION PROCESSING APPARATUS, CONTROL METHOD, AND NON-TRANSITORY COMPUTER-READABLE STORAGE MEDIUM STORING PROGRAM

(71) Applicant: Canon Kabushiki Kaisha, Tokyo (JP)

(72) Inventor: Yusuke Matsui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/386,932

(22) Filed: Jul. 28, 2021

(65) Prior Publication Data
US 2022/0038596 A1 Feb. 3, 2022

(30) Foreign Application Priority Data
Jul. 29, 2020 (JP) .............................. JP2020-128509

(51) Int. Cl.
H04N 1/00 (2006.01)
(52) U.S. Cl.
CPC . *H04N 1/00938* (2013.01); *H04N 2201/0094* (2013.01)
(58) Field of Classification Search
CPC ........ H04N 1/00938; H04N 2201/0094; G06F 3/1225; G06F 3/1285; G06F 3/1204
USPC ....................................................... 358/1.13
See application file for complete search history.

(56) References Cited

U.S. PATENT DOCUMENTS

| | | | |
|---|---|---|---|
| 2016/0019014 A1* | 1/2016 | Nakata | G06F 3/1285 358/1.13 |
| 2016/0350035 A1* | 12/2016 | Horikoshi | G06F 8/61 |
| 2017/0279998 A1* | 9/2017 | Nakagawa | H04N 1/32539 |
| 2020/0174719 A1 | 6/2020 | Yanagawa | |

FOREIGN PATENT DOCUMENTS

JP 2018194910 A 12/2018

OTHER PUBLICATIONS

Extended European Search Report dated Dec. 16, 2021 in counterpart European Patent Application No. 21187416.9.

* cited by examiner

*Primary Examiner* — Neil R McLean
(74) *Attorney, Agent, or Firm* — Venable LLP

(57) ABSTRACT

An information processing apparatus capable of communicating with a device, comprises: an installation unit configured to install a driver corresponding to the device; a determination unit configured to determine whether icon generation by a first generation unit configured to generate an icon cannot be performed in correspondence with the driver installed by the installation unit; and a control unit configured to, if it is determined by the determination unit that icon generation by the first generation unit cannot be performed, generate, by a second generation unit configured to generate an icon, the icon corresponding to the driver installed by the installation unit.

17 Claims, 15 Drawing Sheets

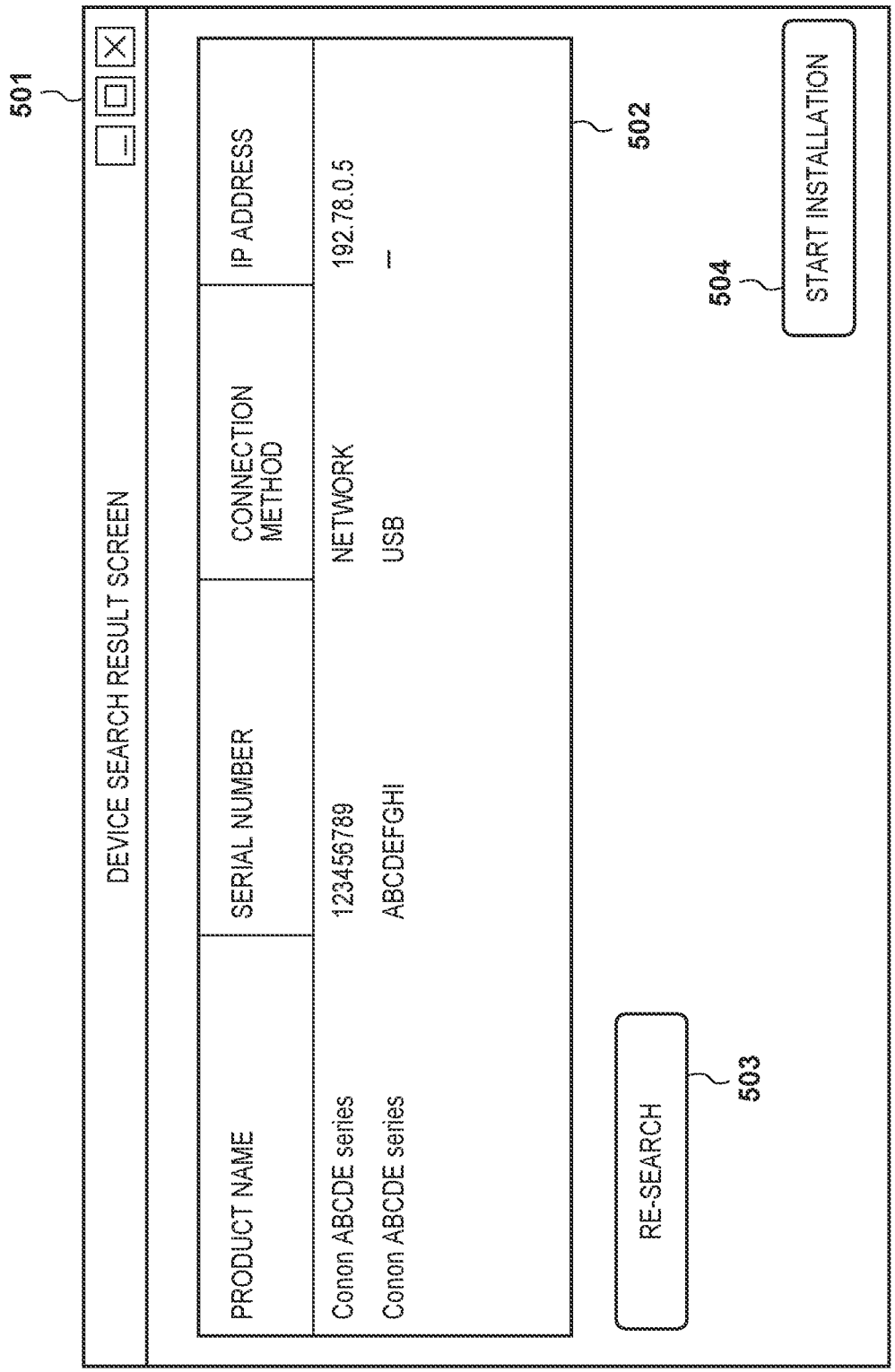

INFORMATION PROCESSING APPARATUS, CONTROL METHOD, AND NON-TRANSITORY COMPUTER-READABLE STORAGE MEDIUM STORING PROGRAM

BACKGROUND

Field

The present disclosure relates to an information processing apparatus capable of installing a driver corresponding to a device, a control method, and a non-transitory computer-readable storage medium storing a program.

Description of the Related Art

To use a peripheral device (to be referred to as a "device" hereinafter) such as a printer from a computer (to be referred to as a "PC" hereinafter), first, a device driver is installed in the PC. Next, a device port in which the destination information (an address, an interface, a protocol, and the like) of the device is set is generated. Then, an icon object (to be referred to as an "icon" hereinafter) identified as a virtual printer device on the OS (Operating System) is generated. At this time, the previously installed device driver and the device port are associated with the icon. Hence, when printing is instructed to the icon, the driver associated with the icon is invoked, and print data is generated. In addition, the print data generated by the driver is transmitted to the device based on the destination information set in the port associated with the icon.

Device drivers installed in a PC are roughly classified into two types. Drivers of one type are drivers provided by the manufacturer of a device, and these are called Outbox drivers. Drivers of the other type are drivers provided by OSs, and these are called Inbox drivers. In general, the Outbox drivers have functions more than those of the Inbox drivers, and from this viewpoint, device manufacturers recommend use of the Outbox drivers.

In a Windows® OS, a device driver can be installed using a function of the OS such as Plug-And-Play or Add Printer Wizard without the use of a driver installer provided from a device manufacturer. If the PC is connected to the Internet, an Outbox driver is downloaded via the Internet by the function of the OS and installed. On the other hand, if the PC is not connected to the Internet, an Inbox driver bundled in the OS in advance is installed.

When installing an Outbox driver in a PC environment where an Inbox driver was already installed, the Inbox driver linked with an icon cannot be replaced. For this reason, the user needs to delete the Inbox driver and an icon (to be referred to as an "Inbox icon" hereinafter) linked with the Inbox driver before installation of the Outbox driver. The user can delete the Inbox driver and the Inbox icon in advance by a method described in Japanese Patent Laid-Open No. 2018-194910.

In recent years, more appropriate processing for driver installation processing is demanded.

SUMMARY

The present disclosure provides a mechanism capable of implementing more appropriate processing for driver installation processing.

The present disclosure in one aspect provides an information processing apparatus capable of communicating with a device, comprising: an installation unit configured to install a driver corresponding to the device; a determination unit configured to determine whether icon generation by a first generation unit configured to generate an icon cannot be performed in correspondence with the driver installed by the installation unit; and a control unit configured to, if it is determined by the determination unit that icon generation by the first generation unit cannot be performed, generate, by a second generation unit configured to generate an icon, the icon corresponding to the driver installed by the installation unit.

According to the present disclosure, when a driver is installed, an icon corresponding to the driver can appropriately be generated.

Further features of the present invention will become apparent from the following description of exemplary embodiments with reference to the attached drawings.

BRIEF DESCRIPTION OF THE DRAWINGS

FIG. 5 is a view showing a UI screen of the application.

DESCRIPTION OF THE EMBODIMENTS

Figure 1:
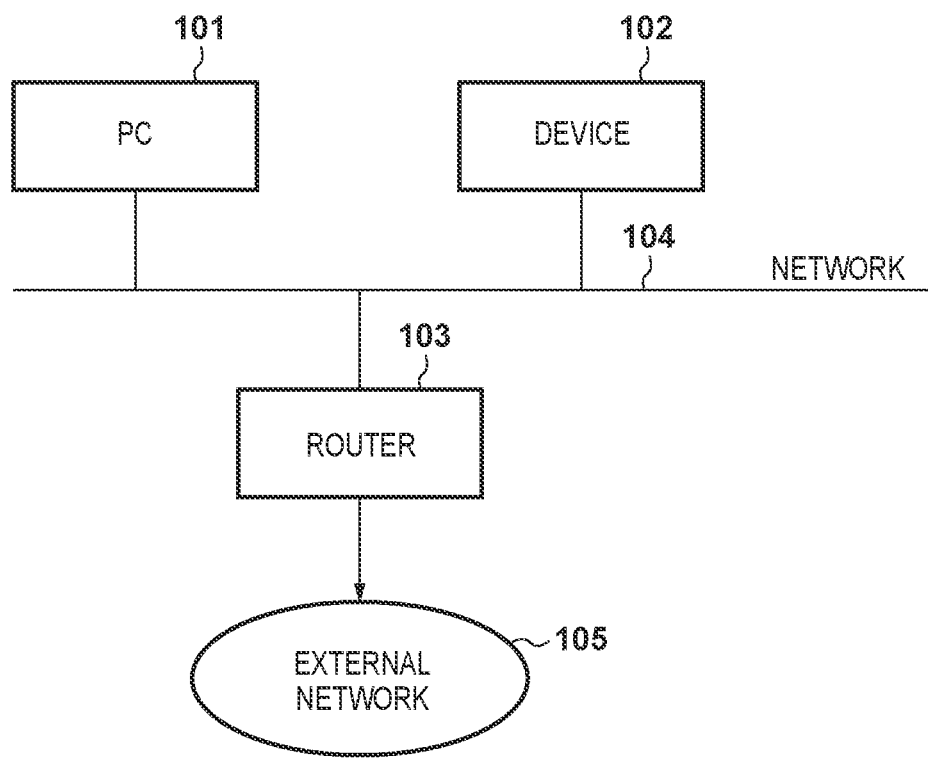
FIG. 1 is a view showing the configuration of a network system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing an example of the configuration of a network system including an information processing apparatus (PC 101). In the system shown in FIG. 1, the PC 101, a device 102, and a router 103 are connected to be communicable with each other via a network 104. The apparatuses communicate with each other in accordance with the TCP/IP (Transmission Control Protocol/Internet Protocol) protocol and the UDP. The network 104 is connected to an external network 105 via the router 103.

The device 102 is a peripheral device such as a printer, a copying machine, a facsimile apparatus, or a scanner, or a device having a composite function thereof. The device 102 supports a predetermined communication protocol, for example, the TCP/IP protocol. Also, the device 102 supports WSD (Web service on Devices) that is a standard network protocol of a Windows OS corresponding to UPnP (Universal Plug and Play). The device 102 also supports the LLMNR (Link-Local Multicast Name Resolution) protocol capable of solving the name of a network device in the neighborhood. As for the WSD function and the LLMNR function of the device 102, the enable/disable state of the functions can be switched by directly operating the device 102 by the user. The router 103 has the DHCP (Dynamic Host Configuration Protocol) server function, and assigns IP addresses to the PC 101 and the device 102.

Figure 2:
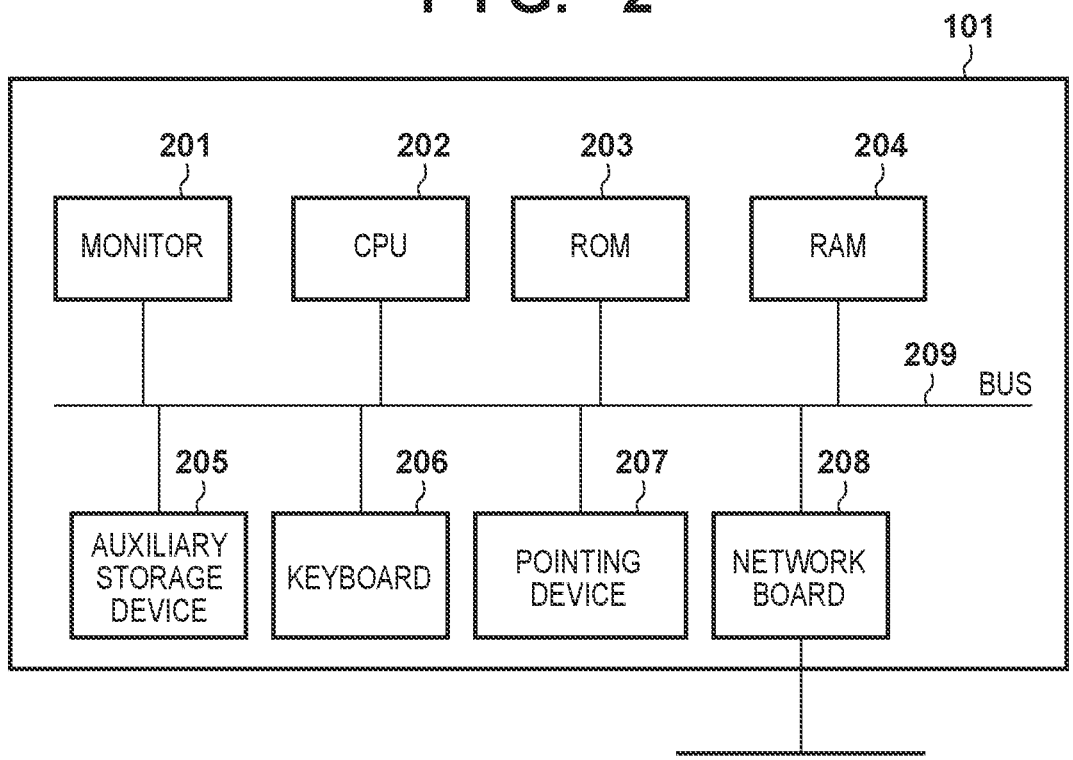
FIG. 2 is a view showing the configuration of a PC.

FIG. 2 is a view showing an example of the configuration of the PC 101. The PC 101 includes a monitor 201, a CPU 202, a ROM 203, a RAM 204, an auxiliary storage device 205, a keyboard 206, a pointing device 207, and a network board 208. The constituent elements are connected to each other via a bus 209. The monitor 201 displays, for example, a user interface (to be referred to as a "UI" hereinafter) screen of an application such as an application 401 or a driver.

The CPU 202 generally controls the PC 101 and, for example, loads programs such as applications and drivers stored in the ROM 203 or the auxiliary storage device 205 into the RAM 204 and executes them. For example, an operation according to this embodiment is implemented when the CPU 202 executes a program loaded into the RAM 204. The ROM 203 stores, for example, basic software such as BIOS and various kinds of programs configured to implement processing to be executed in the PC 101. The RAM 204 temporarily stores, for example, software such as applications and drivers and data to be used by these. The auxiliary storage device 205 is, for example, a hard disk and stores software (programs) such as an OS, applications, drivers, and various modules.

The drivers stored in the auxiliary storage device 205 include a device driver (a scanner driver, a printer driver, a FAX driver, or the like) configured to control the device 102. Also, the drivers stored in the auxiliary storage device 205 include a display control driver configured to control display on the monitor 201, a keyboard driver configured to control the keyboard 206, and a pointing device driver configured to control the pointing device 207. Furthermore, the drivers stored in the auxiliary storage device 205 include a network driver configured to control communication of the network board 208.

Figure 4:
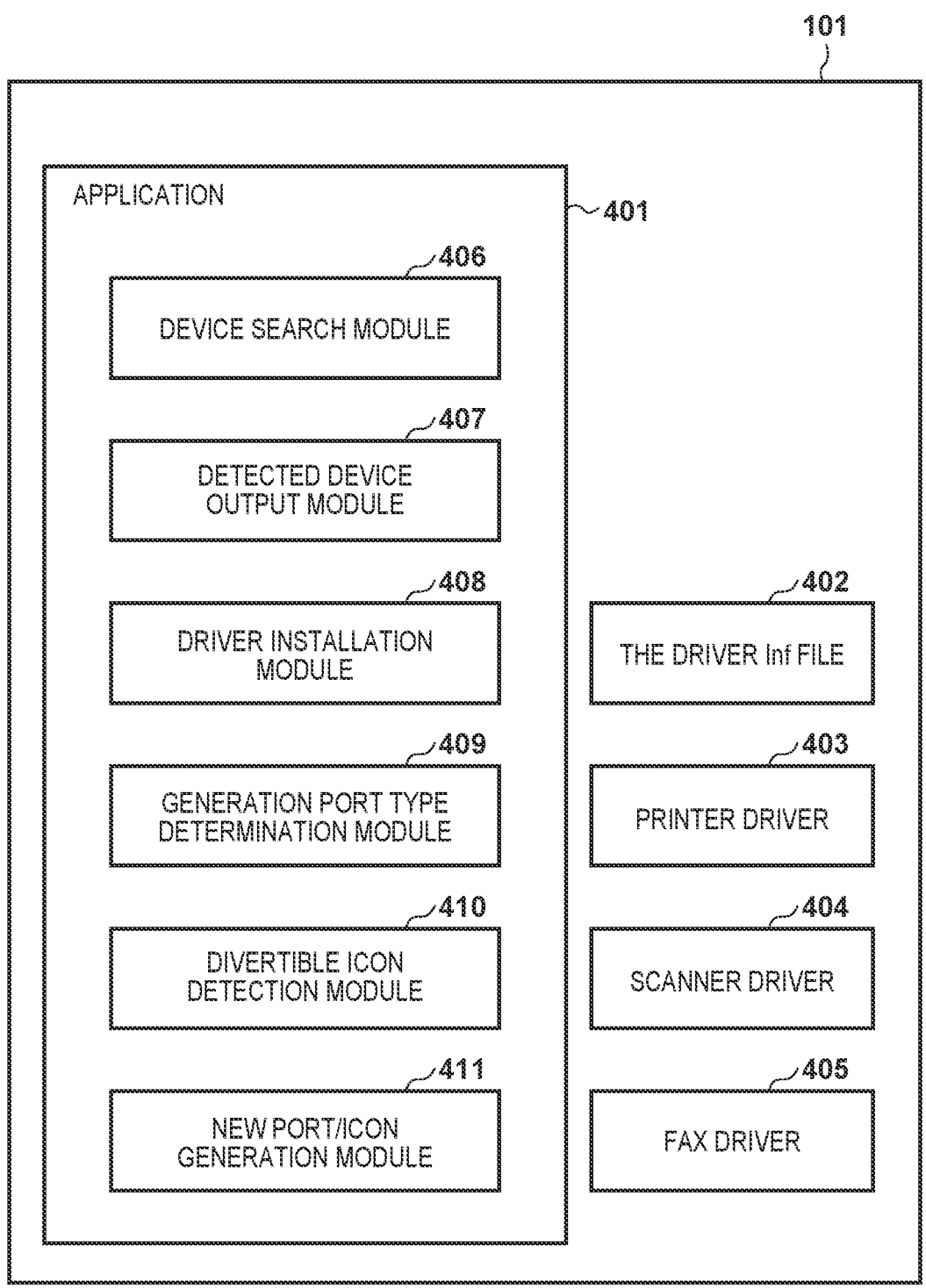
FIG. 4 is a view showing the configuration of an application.

The applications stored in the auxiliary storage device 205 include the application 401 shown in FIG. 4. The application 401 has a device search function by TCP/IP. Note that the application 401 may invoke a module having the search function and cause it to execute the function. The search function may be provided in another module. The keyboard 206 and the pointing device 207 are input devices configured to input instructions from a user. The network board 208 communicates with the device 102 via the network 104.

Figure 3:
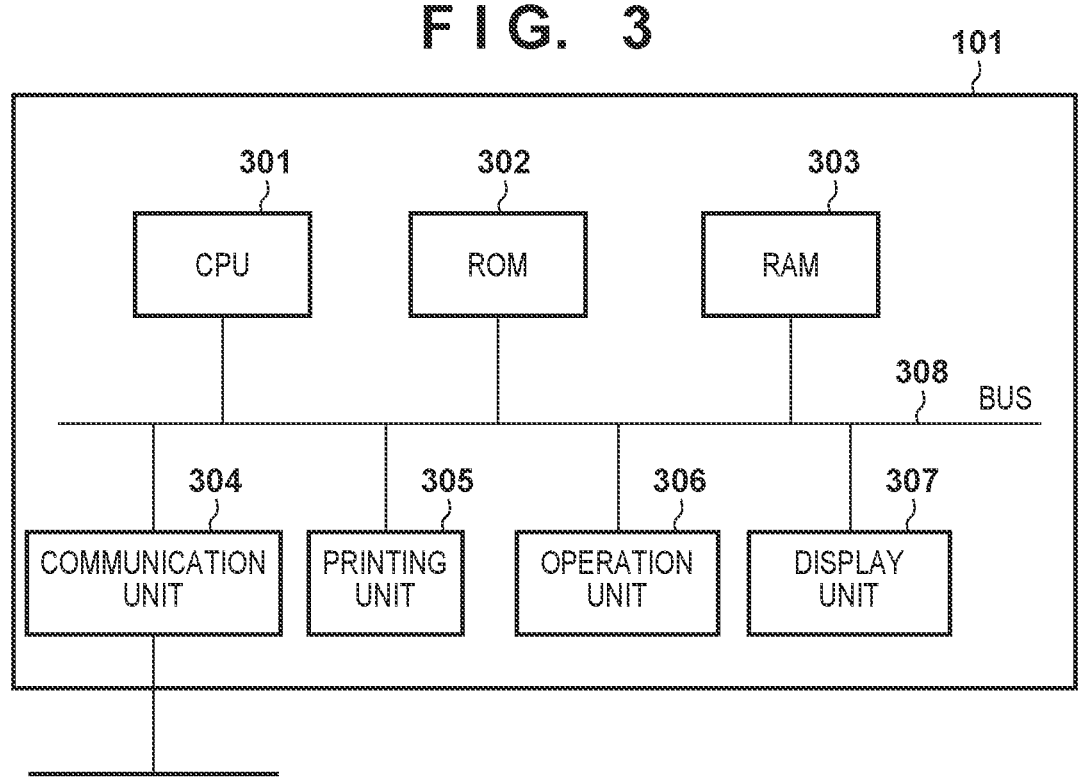
FIG. 3 is a view showing the configuration of a device.

FIG. 3 is a view showing an example of the configuration of the device 102. FIG. 3 shows an example of a hardware configuration in a case in which the device 102 is a printer. The device 102 includes a CPU 301, a ROM 302, a RAM 303, a communication unit 304, a printing unit 305, an operation unit 306, and a display unit 307. Various kinds of constituent elements that constitute the device 102 are connected to each other via a bus 308.

The CPU 301 is, for example, a microprocessor. The CPU 301 functions as the central processing unit of the device 102, and generally controls the device 102. The CPU 301, for example, loads programs stored in the ROM 302 into the RAM 303 and executes the loaded programs, thereby controlling the communication unit 304, the printing unit 305, the operation unit 306, and the display unit 307. The ROM 302 stores, for example, various kinds of programs configured to implement processing to be executed by the device 102. The RAM 303 is used as, for example, the work area of the CPU 301 and temporarily stores various kinds of data.

The communication unit 304 communicates with another device via the network 104. The printing unit 305 performs printing on a print medium such as paper based on, for example, image data. The operation unit 306 is configured to include input devices such as buttons and a touch panel. The display unit 307 displays, for example, a UI configured to operate the device 102 and various kinds of information of the device 102. Note that if the device 102 is a device other than a printer, the device 102 includes another constituent element in place of the printing unit 305 or in addition to the printing unit 305. For example, if the device 102 is a scanner, the device 102 includes a reading unit configured to optically read an image on an original.

An example of a problem assumed in this embodiment will be described here. For example, Windows 10® is equipped with a Microsoft IPP (Internet Printing Protocol) Class Driver (to be referred to as an "IPP driver" hereinafter) as a standard. If an installation target device supports the IPP driver, the IPP driver can be installed using Add Printer Wizard. A WSD (Web service on Devices) port is linked with an icon (to be referred to as a "WSD icon" hereinafter) generated at this time.

Normally, when the WSD icon is deleted, the WSD port linked with the icon is also automatically deleted. However, in the case of the WSD icon generated in linkage with the IPP driver, even if the WSD icon is deleted, the WSD port may remain. If an Outbox driver is installed in the PC environment where the WSD port linked with the IPP driver remains, it may be impossible to generate a new WSD icon because of the remaining WSD port.

FIG. 4 is a block diagram showing an example of the configuration of an application that communicates with the device 102. As shown in FIG. 4, the PC 101 holds the application 401, a driver INF file 402, a printer driver 403, a scanner driver 404, and a FAX driver 405.

The application 401 is a driver installer that installs the driver of a device in the PC 101. The application 401 searches for the device 102 connected to the PC 101, and causes the monitor 201 to display information concerning the device detected by the search. The application 401 then installs, in the PC 101, the driver of a device corresponding to information selected by the user from the pieces of displayed information.

The driver INF file 402 includes driver information corresponding to the driver to be installed by the application 401 (at least one of the printer driver 403, the scanner driver 404, and the FAX driver 405). The driver information includes, for example, the model information of the driver.

The application 401 includes a device search module 406, a detected device output module 407, a driver installation module 408, a generation port type determination module 409, a divertible icon detection module 410, and a new port/icon generation module 411. The modules shown in FIG. 4 are implemented when the CPU 202 of the PC 101 reads out the application 401 stored in the auxiliary storage device 205 and executes it. In this embodiment, the application 401 searches for a device in the same network and displays the detected device on the monitor 201. On the other hand, if a device in the same network cannot be searched, the application 401 displays, on the monitor 201, a message representing that no device can be detected.

The device search module 406 compares the device name information of a target device acquired from the driver INF file 402 including driver information with the device name information of a device searched by the device search module 406. Here, the target device indicates the model of a device that the application 401 supports. If the device name information of the device searched by the device search module 406 matches the device name information of the target device acquired from the driver INF file 402, the detected device output module 407 displays the detected device on the monitor 201. The user can select a desired device from the list of devices displayed on the monitor 201.

The driver installation module 408 installs a driver corresponding to the device (to be referred to as a "desired device" hereinafter) selected by the user from the devices displayed by the detected device output module 407. Note that the driver to be installed changes depending on the type of the device selected by the user from the devices displayed by the detected device output module 407. For example, if the device selected by the user is a printer, the application 401 installs the printer driver 403 in the PC 101. If the device selected by the user is a scanner, the application 401 installs the scanner driver 404 in the PC 101. The device selected by the user may be an MFP (Multi-Function Printer). In this case, the application 401 installs, in the PC 101, at least one of the printer driver 403, the scanner driver 404, and the FAX driver 405. For example, if the MFP has a scanner function and a print function, the printer driver 403 and the scanner driver 404 are installed. Also, for example, if the MFP has a scanner functions, a print function, and a FAX function, the printer driver 403, the scanner driver 404, and the FAX driver 405 are installed. If an Inbox driver corresponding to the desired device is linked with an icon already registered in the PC, the linked Inbox driver can be replaced with an Outbox driver provided from the manufacturer of the device while keeping the icon as it is. In this embodiment, a case will be described, in which an Outbox driver is installed by the device installer, thereby replacing an Inbox driver with the Outbox driver.

The generation port type determination module 409 communicates with the device 102 and specifies the type of a port (port type) that can be generated in the PC 101. The divertible icon detection module 410 detects a divertible icon from existing icons already registered in the PC 101. In this embodiment, a divertible icon indicates an icon linked with a driver installed by the driver installation module 408 and also linked with a port capable of communicating with the device 102. The new port/icon generation module 411 newly generates an icon and a port capable of communicating with the device 102 based on the port type specified by the generation port type determination module 409.

FIG. 5 is a view showing an example of a UI screen of the application 401, which shows a device detection result displayed on the monitor 201 by the detected device output module 407. Each item shown in FIG. 5 will be described later.

Figure 6A:
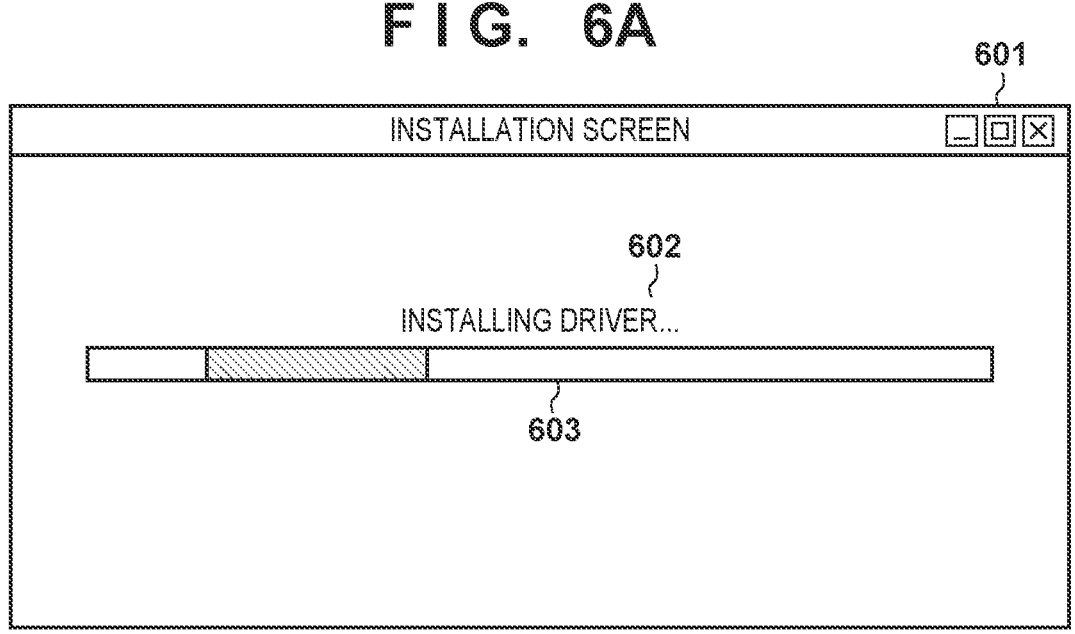
FIGS. 6A and 6B are views showing a UI screen of the application.

FIG. 6A is a view showing an example of a UI screen of the application 401. The screen shown in FIG. 6A is displayed when the application 401 is executing the driver installation module 408, the generation port type determination module 409, the divertible icon detection module 410, and the new port/icon generation module 411. An installation screen 601 includes an internal processing status 602 representing the status of internal processing. For example, if the application 401 is executing processing of the driver installation module 408, a message such as "installing driver . . . " and a progress bar 603 are displayed in the internal processing status 602.

Figure 6B:
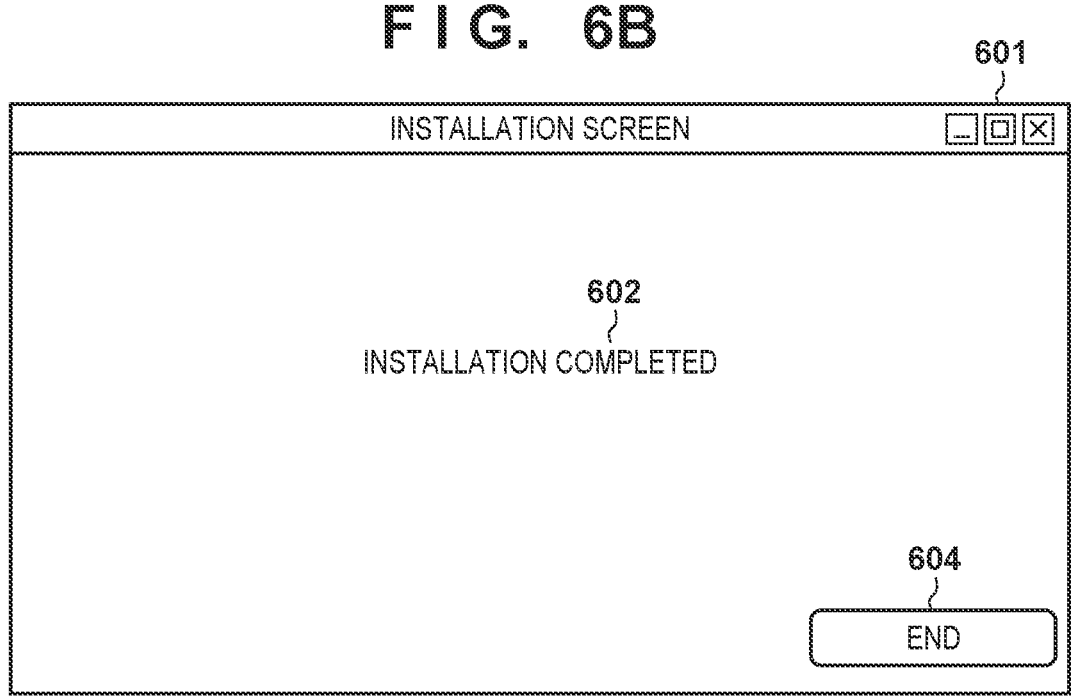

FIG. 6B is a view showing an example of a UI screen of the application 401, which is displayed when the internal processing in FIG. 6A is completed. For example, if the processing of the driver installation module 408 is completed, the message 602 representing completion of installation is displayed.

Figure 7:
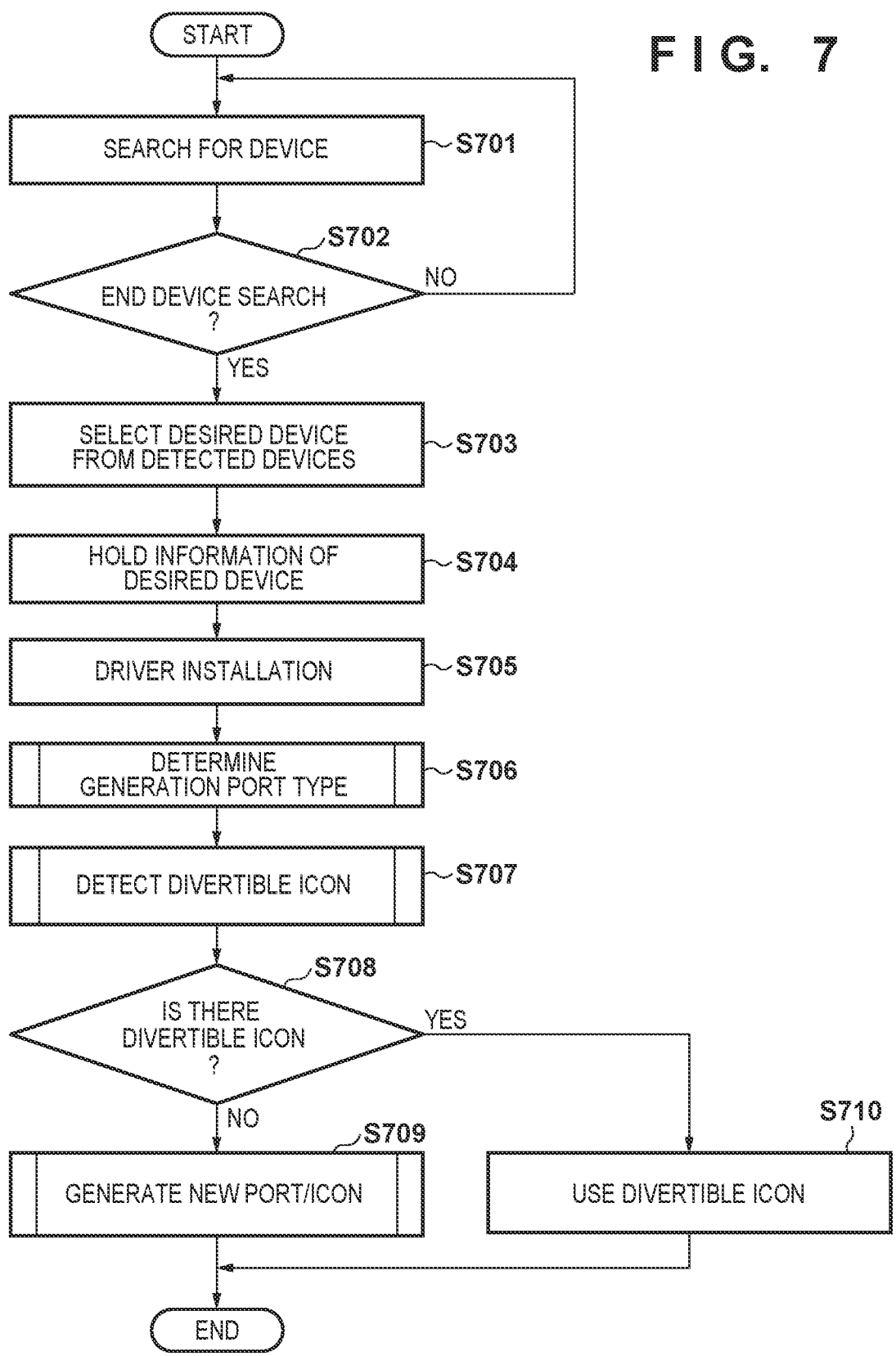
FIG. 7 is a flowchart showing processing of the application.

FIG. 7 is a flowchart showing processing from activation of the application 401 to an end. First, when the application 401 is activated, the application 401 displays a device search result screen 501 shown in FIG. 5. The application 401 displays the default screen of the device search result screen 501 and then automatically starts searching for a device connected to the PC 101 without intervention of a user operation (step S701). At this time, not only devices on the network but also devices connected by different interfaces (for example, a USB (Universal Serial Bus) cable) may be searched for simultaneously. When the device search is ended (YES in step S702), the application 401 displays detected devices in a device list 502. The application 401 accepts selection of a desired device from the device list shown in FIG. 5 and pressing of an installation start button 504 by the user (step S703). On the other hand, if the device desired by the user cannot be found in the device list 502, or no devices are displayed in the device list 502, the user presses a re-search button 503. When the user operation is accepted, device search is executed again by the device search module 406. Note that when the re-search button 503 is pressed, the application 401 clears the contents of the device list 502.

When the selection of the desired device from the detected devices is accepted, and the installation start button 504 is pressed, the application 401 switches the UI from the device search result screen 501 to the driver installation screen 601. At this time, the application 401 stores the network information (an IP address and the like) of the selected device (step S704). Note that the network information is acquired from each device searched at the time of device search in step S701. When the UI switches to the driver installation screen 601, the application 401 executes installation processing of the selected device (step S705). The application 401 executes generation port type determination processing (step S706) in FIG. 8 to be described later and divertible icon detection processing (step S707) shown in FIG. 9 to be described later in this order. The driver installation processing (step S705) is executed by the driver installation module 408. The generation port type determination processing (step S706) is executed by the generation port type determination module 409. The divertible icon detection processing (step S707) is executed by the divertible icon detection module 410.

The application 401 determines whether a divertible icon is detected by the divertible icon detection processing (step S707) (step S708). If no divertible icon is detected in step S707 (NO in step S708), new port/icon generation processing is executed by the new port/icon generation module 411 (step S709). In the new port/icon generation processing, new ports and icons linked with the various kinds of drivers 403 to 405 installed by the driver installation module 408 are generated based on the port type determined by the generation port type determination processing. The processing of step S709 will be described later with reference to FIG. 12.

On the other hand, if a divertible icon is detected by the divertible icon detection processing of step S707 (YES in step S708), the application 401 does not generate a new port/icon and uses the detected divertible icon (step S710). That is, the divertible icon is directly used, and the driver linked with the divertible icon is changed to the driver installed in step S705. When the processing of step S709 or S710 ends, the application 401 displays the screen shown in FIG. 6B, which represents that the installation processing is completed. At this time, when the user presses an end button 604, the processing shown in FIG. 7 is ended.

Figure 8:
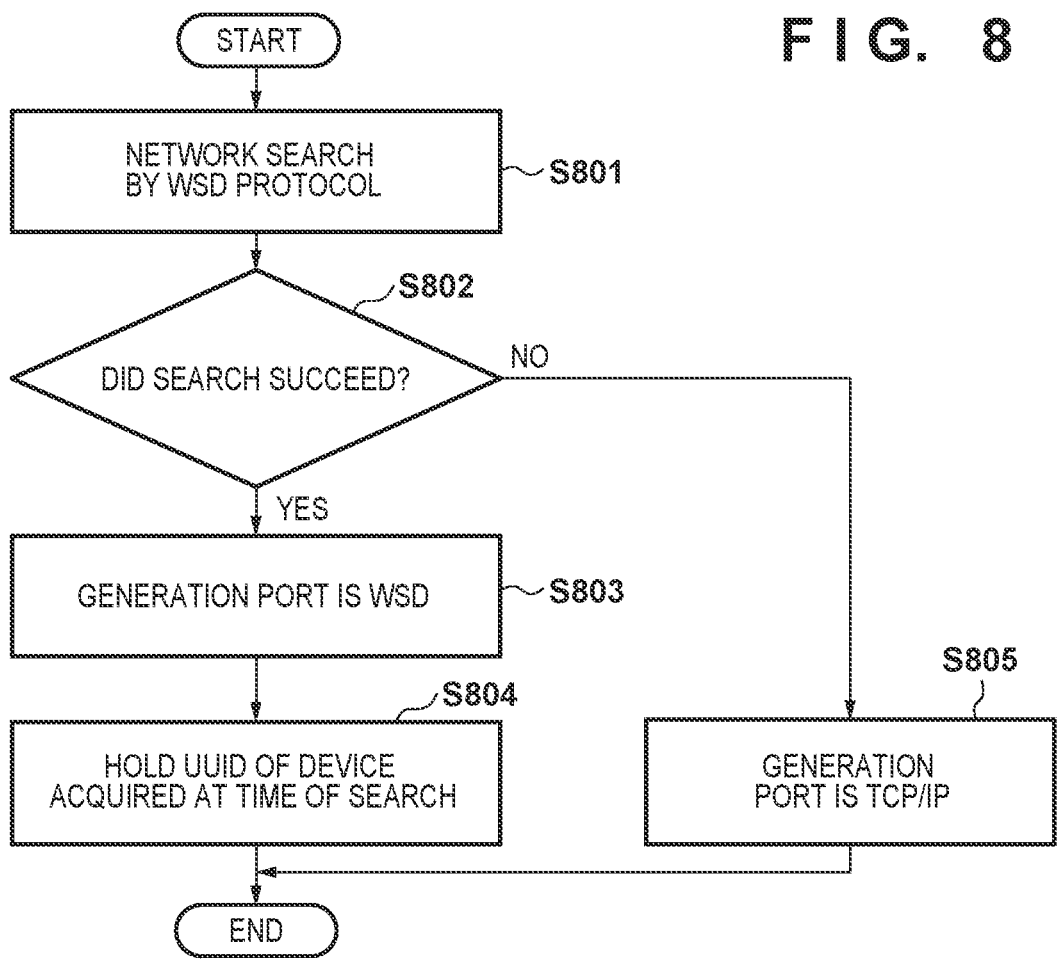
FIG. 8 is a flowchart showing processing of step S706.

FIG. 8 is a flowchart showing generation port type determination processing (step S706) in FIG. 7. In FIG. 8, priority orders are set to communication ports, and determination processing of the type of a port to be generated is executed in the descending order of priority orders of the ports. The priorities of ports according to this embodiment are set in the order of WSD and TCP/IP. First, the generation port type determination module 409 executes network device search processing by the WSD protocol (step S801). That is, the generation port type determination module 409 searches for a device connected to the network 104 in accordance with the WSD protocol.

The generation port type determination module 409 determines whether a device that matches the network information of the desired device stored in step S704 is detected as the result of the device search (step S802). For example, the generation port type determination module 409 determines whether a device that has the same IP address as the IP address stored in step S704 is detected by the search processing of step S801. If a device that matches the network information of the desired device stored in step S704 is detected (YES in step S802), the generation port type determination module 409 judges that the type of the port to be generated is WSD (step S803). After step S803, the generation port type determination module 409 holds the UUID of the device acquired at the time of the network device search by the WSD protocol (step S804), and ends the processing shown in FIG. 8. On the other hand, if a device that matches the network information of the desired device stored in step S704 is not detected (NO in step S802), the generation port type determination module 409 determines that the type of the port to be generated is TCP/IP protocol (step S805), and ends the processing shown in FIG. 8.

Figure 9:
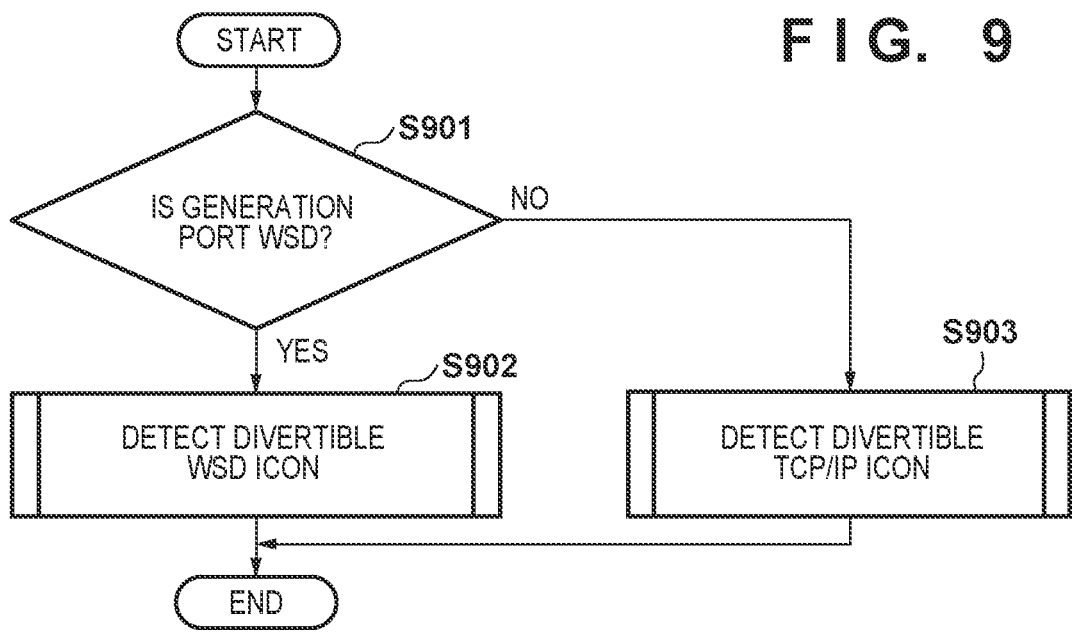
FIG. 9 is a flowchart showing processing of step S707.

FIG. 9 is a flowchart showing divertible icon detection processing (step S707) in FIG. 7. First, the divertible icon detection module 410 determines whether the type of the port to be generated is WSD or TCP/IP as the result of generation port type determination processing of step S706 (step S901). If the type of the port to be generated is WSD (YES in step S901), the divertible icon detection module 410 executes divertible WSD icon detection processing shown in FIG. 10 to be described later (step S902). On the other hand, if the type of the port to be generated is TCP/IP (NO in step S901), the divertible icon detection module 410 executes divertible TCP/IP icon detection processing shown in FIG. 11 to be described later (step S903). After step S902 or S903, the divertible icon detection module 410 ends the processing shown in FIG. 9.

Figure 10:
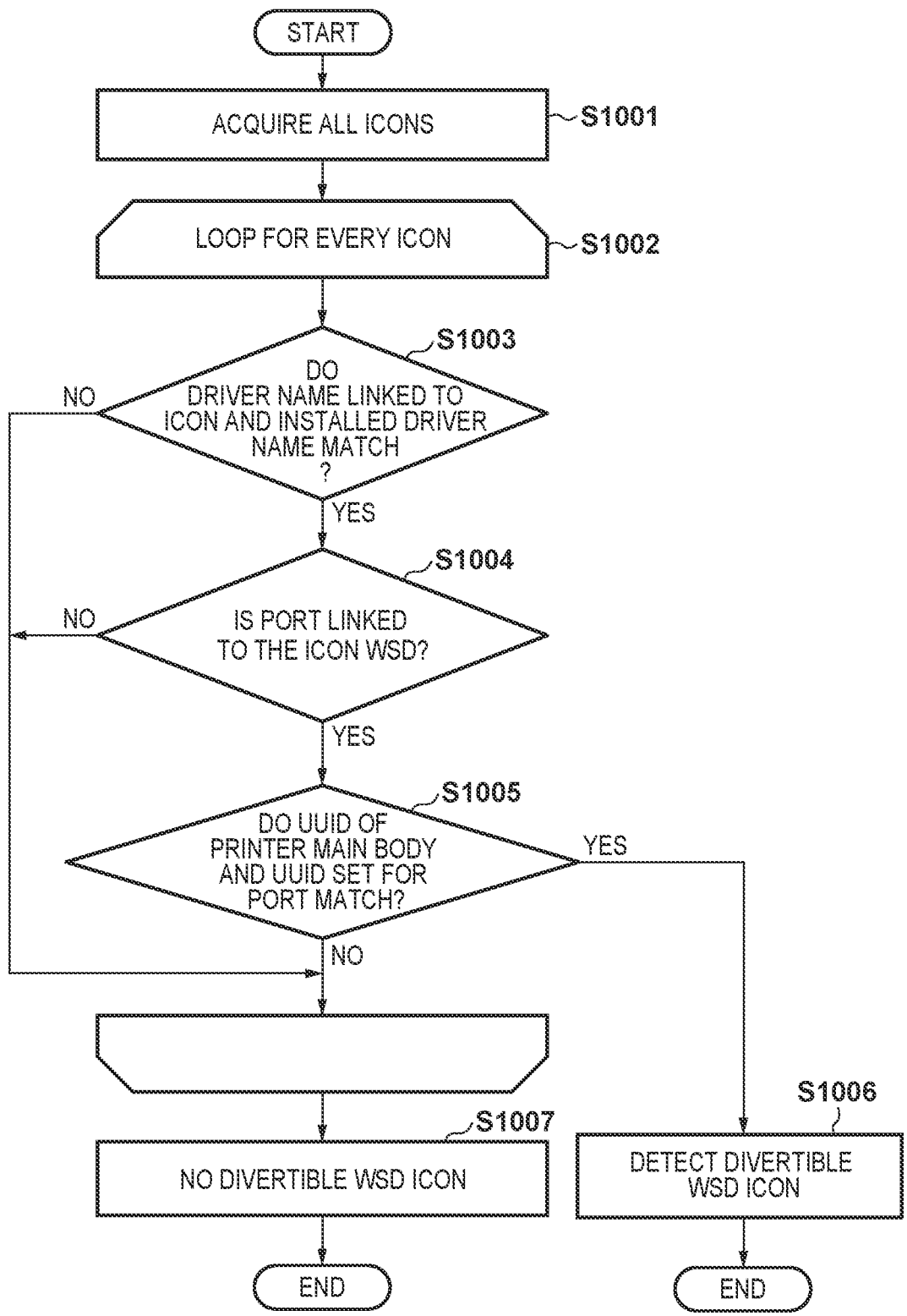
FIG. 10 is a flowchart showing processing of step S902.

FIG. 10 is a flowchart showing divertible WSD icon detection processing (step S902) in FIG. 9. First, the divertible icon detection module 410 acquires the icon information of all icons registered in the PC 101 (step S1001). Note that the icon information includes, for example, a driver name, a port type, a port name, and the like linked with the icon. After the icon information is acquired, the divertible icon detection module 410 starts loop processing for searching for a divertible WSD icon for all pieces of icon information acquired in step S1001 (step S1002). In the loop processing, first, the divertible icon detection module 410 determines whether a driver name linked with a check target icon that is the target of the loop processing matches the name of the driver installed in step S705 (step S1003). If the driver name linked with the icon of the check target does not match the name of the installed driver (NO in step S1003), the divertible icon detection module 410 starts check of the icon information of the next icon. On the other hand, if the driver name linked with the icon matches the name of the installed driver (YES in step S1003), the divertible icon detection module 410 determines whether the type of the port linked with the check target icon is WSD (step S1004).

If the type of the port linked with the icon is not WSD (NO in step S1004), the divertible icon detection module 410 starts check of the next icon. On the other hand, if the type of the port linked with the icon is WSD (YES in step S1004), the divertible icon detection module 410 determines whether the UUID set in the WSD port matches the UUID of the device held in step S804 (step S1005). More specifically, the divertible icon detection module 410 acquires a UUID corresponding to the port name acquired in step S1001 from a UUID management module. Step S1005 is executed using the UUID acquired here.

As described above, in steps S1003 to S1005, as the result of icon determination, a divertible WSD icon that satisfies the conditions is detected.

If the UUIDs do not match (NO in step S1005), the divertible icon detection module 410 starts check of the next icon. On the other hand, if the UUIDs match (YES in step S1005), the divertible icon detection module 410 ends the loop processing, judges that a divertible WSD icon is detected (step S1006), and then ends the processing shown in FIG. 10. On the other hand, if the loop processing is performed for all icons, the divertible icon detection module 410 judges that there is no divertible WSD icon (step S1007), and then ends the processing shown in FIG. 10.

Figure 11:
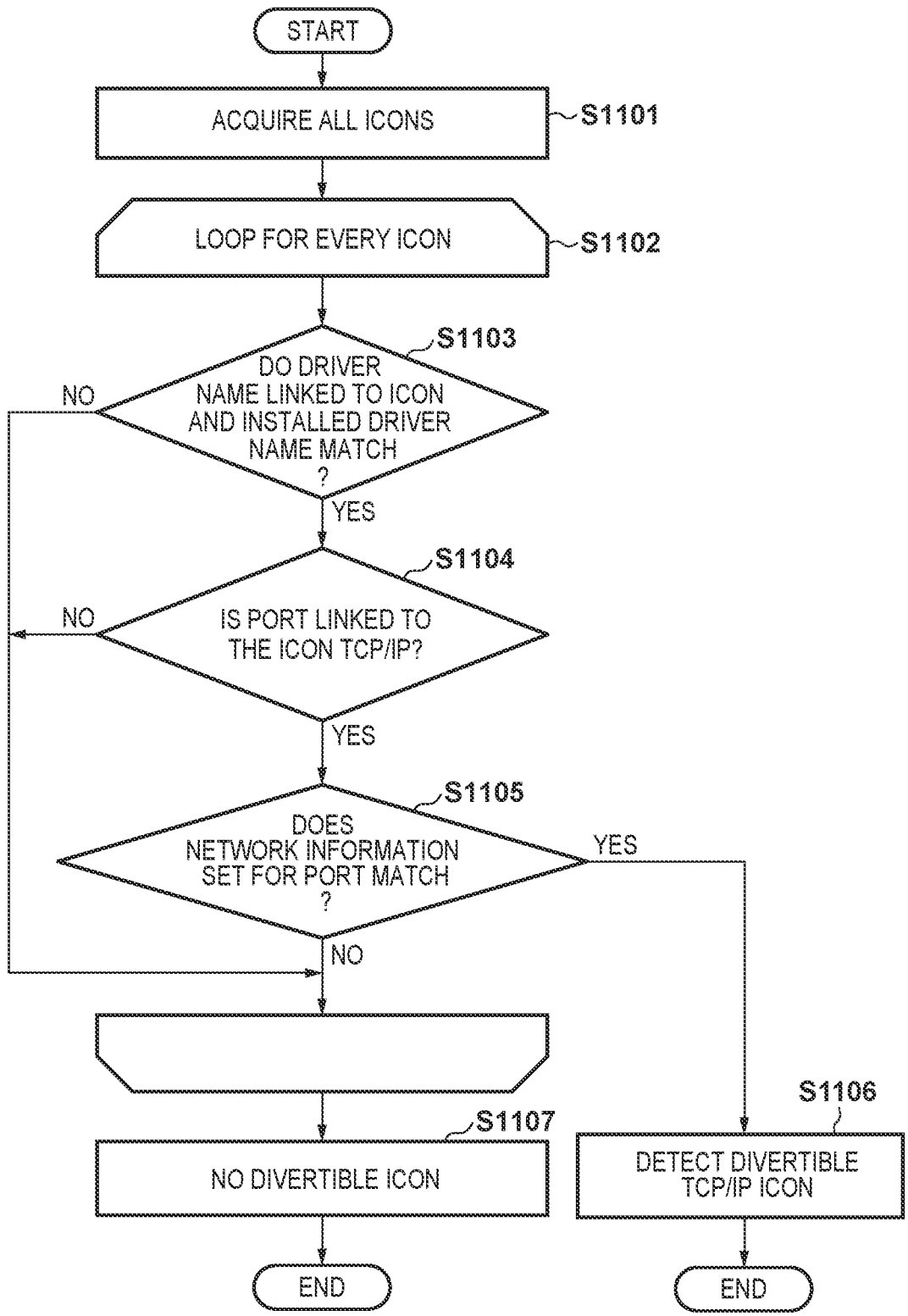
FIG. 11 is a flowchart showing processing of step S903.

FIG. 11 is a flowchart showing divertible TCP/IP icon detection processing (step S903) in FIG. 9. First, the divertible icon detection module 410 acquires the icon information of all icons registered in the PC 101 (step S1101). After the icon information is acquired, the divertible icon detection module 410 starts loop processing for searching for a divertible TCP/IP icon for all pieces of icon information acquired in step S1101 (step S1102). In the loop processing, first, the divertible icon detection module 410 determines whether a driver name linked with a check target icon that is the target of the loop processing matches the name of the driver installed in step S705 (step S1103). If the driver name linked with the icon does not match the name of the installed driver (NO in step S1103), the divertible icon detection module 410 starts check of the icon information of the next icon. On the other hand, if the driver name linked with the icon of the check target matches the name of the installed driver (YES in step S1103), the divertible icon detection module 410 determines whether the type of the port linked with the check target icon is TCP/IP (step S1104).

If the port linked with the icon is not TCP/IP (NO in step S1104), the divertible icon detection module 410 starts check of the icon information of the next icon. On the other hand, if the port linked with the icon is TCP/IP (YES in step S1104), the process advances to step S1105. The divertible icon detection module 410 determines whether the network information set to the TCP/IP port matches the network information of the device held in step S704 (step S1105). The network information is, for example, an IP address.

As described above, in steps S1103 to S1105, as the result of icon determination, a divertible TCP/IP icon that satisfies the conditions is detected.

If the pieces of network information do not match (NO in step S1105), the divertible icon detection module 410 starts check of the icon information of the next icon. On the other hand, if the pieces of network information match (YES in step S1105), the divertible icon detection module 410 ends the loop processing, judges that a divertible TCP/IP icon is detected (step S1106), and then ends the processing shown in FIG. 11. On the other hand, if the loop processing is performed for all icons, the divertible icon detection module 410 judges that there is no divertible TCP/IP icon (step S1107), and then ends the processing shown in FIG. 11.

Figure 12:
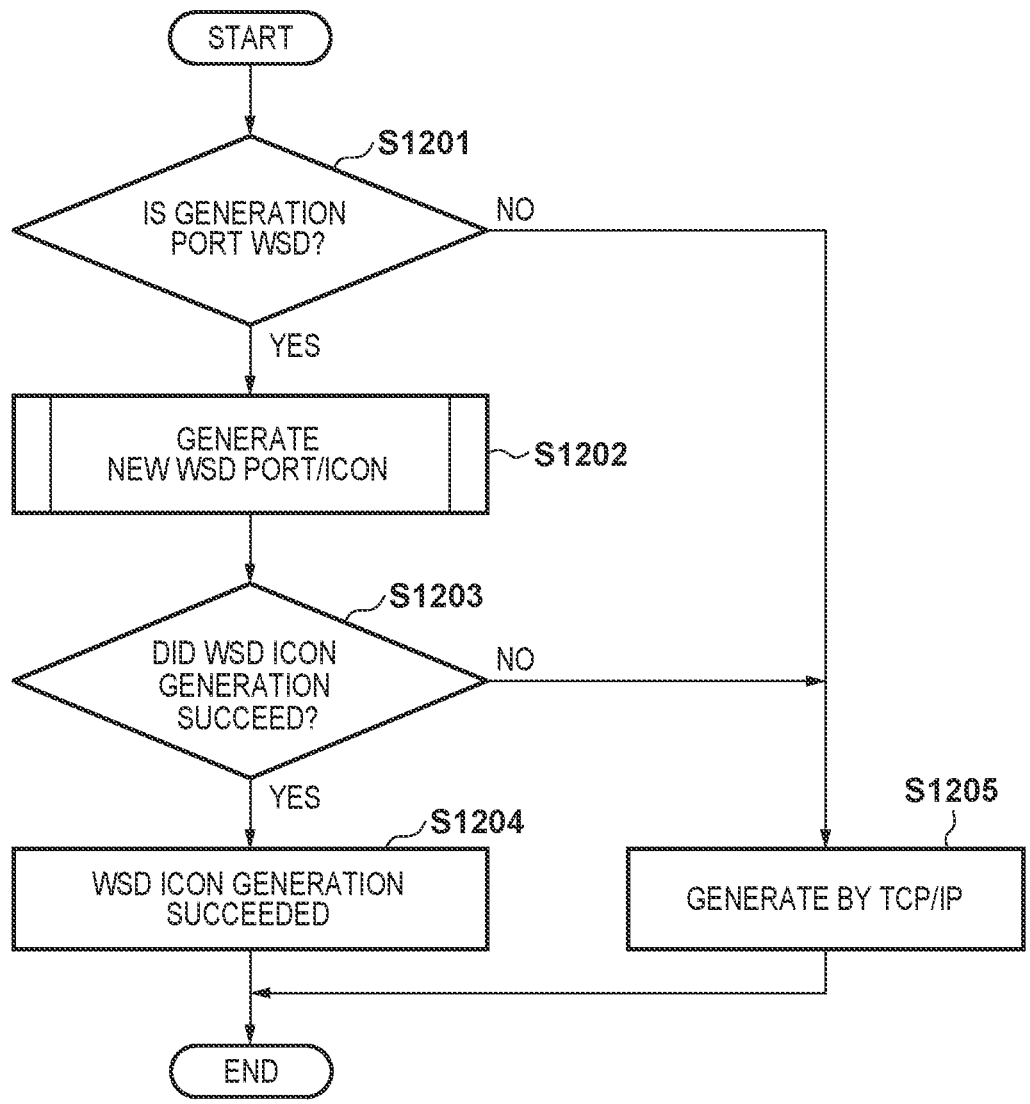
FIG. 12 is a flowchart showing processing of step S709.

FIG. 12 is a flowchart showing new port/icon generation processing (step S709) in FIG. 7. First, the new port/icon generation module 411 determines whether the port type determined by the generation port type determination processing of step S706 is WSD or TCP/IP (step S1201). If the port type determined by the generation port type determination processing of step S706 is TCP/IP (NO in step S1201), the new port/icon generation module 411 generates a new port/icon by TCP/IP (step S1205).

On the other hand, if the port type determined by the generation port type determination processing of step S706 is WSD (YES in step S1201), the new port/icon generation module 411 starts new WSD port/icon generation processing in FIG. 13 to be described later (step S1202). The new port/icon generation module 411 determines whether generation of a new WSD port/icon has succeeded (step S1203).

If generation of a new WSD port/icon has succeeded (YES in step S1203), the new port/icon generation module 411 judges that generation of a WSD icon has succeeded (step S1204) and then ends the processing shown in FIG. 12. On the other hand, if generation of a new WSD port/icon has failed (NO in step S1203), the new port/icon generation module 411 generates a new port/icon by TCP/IP instead (step S1205). After step S1205, the new port/icon generation module 411 ends the processing shown in FIG. 12.

Figure 13:
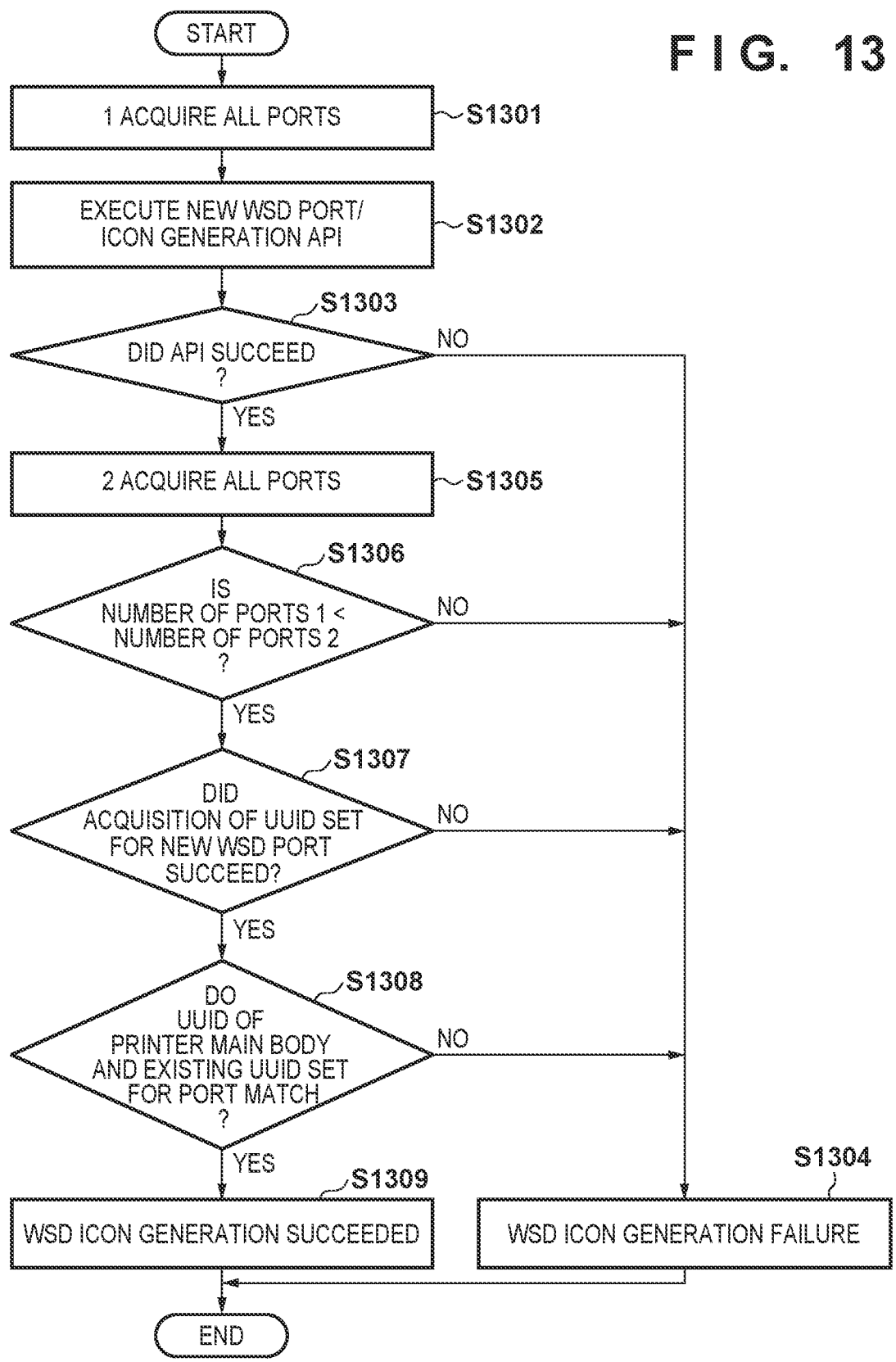
FIG. 13 is a flowchart showing processing of step S1202.

FIG. 13 is a flowchart showing new WSD port/icon generation processing (step S1202) in FIG. 12. First, the new port/icon generation module 411 acquires all ports registered in the PC 101 (step S1301). When all ports registered in the PC 101 are acquired, the new port/icon generation module 411 executes a new WSD port/icon generation API (step S1302). Note that when the new WSD port/icon generation API is executed, an icon and a WSD port for the icon are generated. The new port/icon generation module 411 determines whether a reply from the new WSD port/icon generation API indicates a success or a failure (step S1303).

If the reply from the new WSD port/icon generation API indicates a failure (NO in step S1303), the new port/icon generation module 411 judges that the WSD icon generation has failed (step S1304), and then ends the processing shown in FIG. 13. On the other hand, if the reply from the new WSD port/icon generation API indicates a success (YES in step S1303), the new port/icon generation module 411 acquires all ports registered in the PC 101 again (step S1305).

When all ports registered in the PC 101 are acquired, the new port/icon generation module 411 determines whether the number of ports acquired in step S1305 is larger than the number of ports acquired in step S1301 (step S1306). If the number of ports acquired in step S1305 is not larger than the number of ports acquired in step S1301 (that is, the number of ports has not increased) (NO in step S1306), the new port/icon generation module 411 judges that the WSD icon generation has failed (step S1304). After step S1304, the processing shown in FIG. 13 is ended.

On the other hand, if the number of ports acquired in step S1305 is larger than the number of ports acquired in step S1301 (that is, the number of ports has increased) (YES in step S1306), the process advances to step S1307. The new port/icon generation module 411 attempts to acquire a UUID set to the newly generated new WSD port and determines whether the acquisition has succeeded (step S1307). More specifically, the new port/icon generation module 411 specifies a port corresponding to the increase in step S1306 as a new port. The new port/icon generation module 411 attempts to acquire the UUID of the port name specified as the new port. If acquisition of the UUID of the newly generated WSD port has failed (NO in step S1307), the new port/icon generation module 411 judges that the WSD icon generation has failed (step S1304), and then ends the processing shown in FIG. 13.

On the other hand, if acquisition of the UUID of the newly generated WSD port has succeeded (YES in step S1307), the process advances to step S1308. The new port/icon generation module 411 determines whether the UUID of the new WSD port acquired in step S1307 matches the UUID of the device held in step S804 (step S1308). If the UUID of the new WSD port acquired in step S1307 does not match the UUID of the device held in step S804 (NO in step S1308), the new port/icon generation module 411 judges that the WSD icon generation has failed (step S1304). After step S1304, the new port/icon generation module 411 ends the processing shown in FIG. 13.

On the other hand, if the UUID of the new WSD port acquired in step S1307 matches the UUID of the device held in step S804 (YES in step S1308), the new port/icon generation module 411 judges that the WSD icon generation has succeeded (step S1309). After step S1309, the new port/icon generation module 411 ends the processing shown in FIG. 13.

As described above, according to this embodiment, if the application 401 judges, as the result of port determination, that there is no divertible icon that satisfies the conditions, the new port/icon generation processing shown in FIG. 12 is executed. In the new port/icon generation processing, the application 401 compares the numbers of ports acquired before and after execution of the new WSD port/icon generation API, and judges, based on the comparison result, whether a new WSD icon is generated. With this configuration, even if a port that impedes new WSD icon generation remains in the PC 101, and generation of the new WSD icon fails, the application 401 can generate a new icon by another port (TCP/IP port). As a result, it is possible to prevent a situation that an icon that should be an operation target for the user is not generated because of the remaining port. In addition, since it is determined, based on the UUID set to the new WSD port, whether the new WSD port is a WSD port linked with the desired printer, it is possible to more correctly determine whether generation of the new WSD icon has succeeded.

Note that although in this embodiment, an example in which a WSD port and a TCP/IP port are used in the generation port type determination processing of step S706 has been described, the present embodiment is not limited to this. For example, another protocol such as the IPP (Internet Printing Protocol) may be added to the determination processing, or the protocols may be replaced. Also, in this embodiment, the priorities of communication ports to be generated are set in the order of WSD and TCP/IP. However, for example, another protocol may be added, like WSD, TCP/IP, and IPP. Alternatively, the priority orders may be changed in accordance with the state of the application 401 or the device 102.

Also, in this embodiment, the application 401 automatically determines the communication port without intervention of a user operation. However, for example, a screen configured to newly designate a generation port may be displayed on the UI of the application, and the user may designate a communication port to be generated. At this time, if generation by the designated communication port has failed, a screen that notifies that generation by the designated communication port has failed may be displayed, or the application 401 may automatically determine and generate an alternate communication port without intervention of a user operation.

Also, in this embodiment, after the user selects the desired device on the device search result screen 501 in step S703, the generation port type determination processing of step S706 is executed. However, the generation port type determination processing of step S706 may be executed immediately after a device is detected in the device search processing of step S701. On the other hand, a device connected by a plurality of interfaces (for example, a network and a USB) may be searched for. In this case, if the generation port type determination processing of step S706 is executed immediately after the device search processing of step S701, and the user selects a USB device, the generation port type determination processing may be meaningless. Hence, when searching for a device for a plurality of interfaces, after the user specifies a desired device and a desired interface, the generation port type determination processing of step S706 (step S706) may be executed as needed. With this configuration, the processing efficiency can be improved by reducing packets to be transmitted.

Second Embodiment

The second embodiment will be described below concerning points different from the first embodiment. As described in the first embodiment, even if a port that impedes new WSD icon generation remains in a PC 101, and generation of a new WSD icon fails, an application 401 can generate a new icon by another port.

In this embodiment, the following use case will further be assumed. For example, the installation target device is assumed to be a device (for example, MFP) that supports a plurality of functions like print and FAX. In addition, for the installation target device, a WSD icon and a WSD port are generated in the PC 101 when the IPP driver is installed by the function of the OS. After that, the WSD icon is deleted by a user operation, and only the WSD port remains. If installation by the installer is performed in such a PC environment, first, printer driver installation processing and printer icon generation processing (step S709) or use of a divertible icon for a printer (step S710) is performed by processing according to the above-described first embodiment. Then, only a WSD icon for the FAX function is generated by diverting the remaining WSD port. This is because although the FAX function supports the WSD port, but the IPP driver does not support the FAX function.

In the use case as described above, the application 401 determines, based on the absence of a change in the number of ports registered in the PC 101, that WSD icon generation has failed, and executes generation of a TCP/IP port. In this case, two FAX icons for the WSD port and the TCP/IP port are generated. In this embodiment, even in the use case as described above, it is possible to prevent two FAX icons for the WSD port and the TCP/IP port from being generated redundantly.

Figure 14:
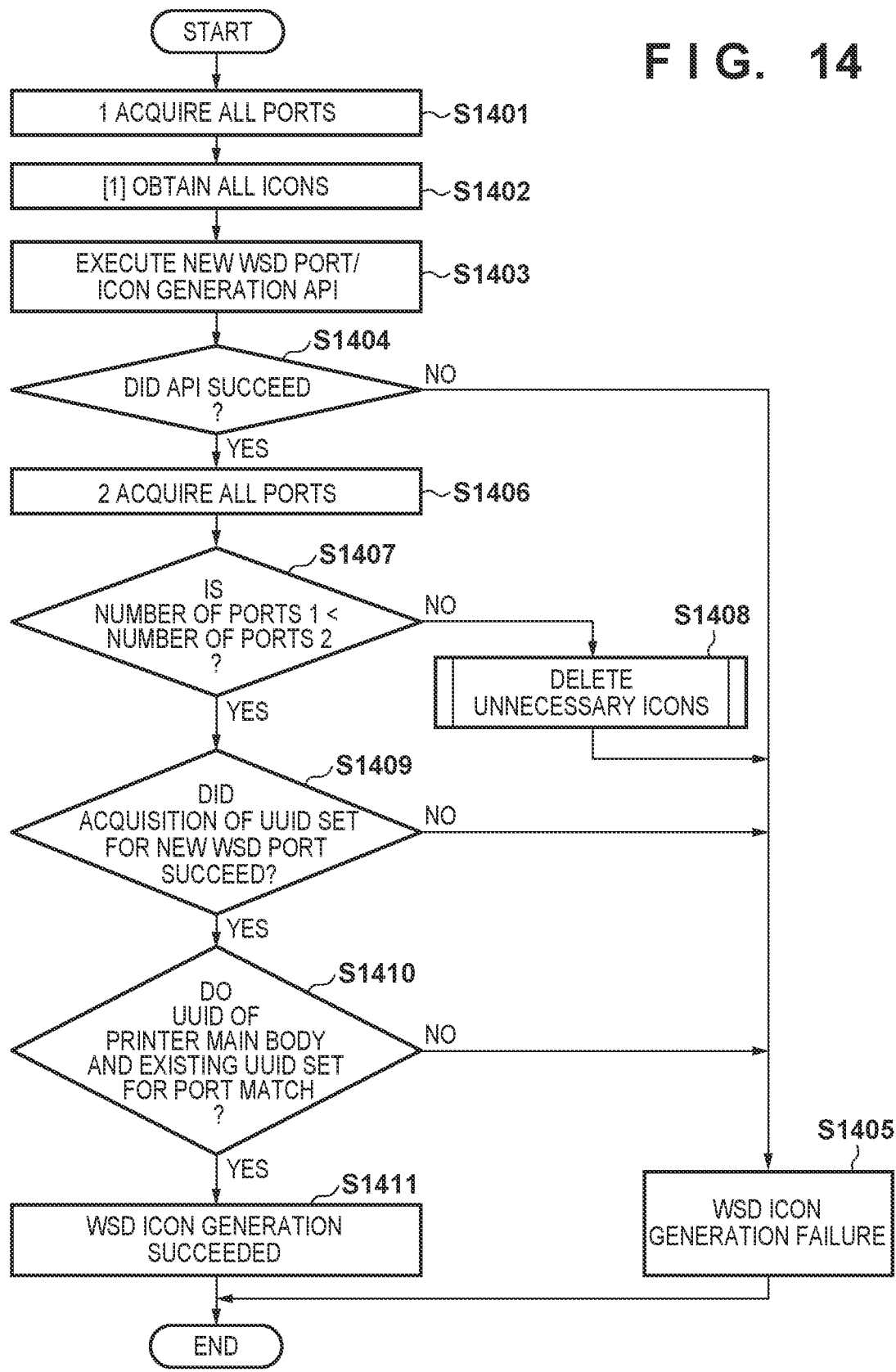
FIG. 14 is a flowchart showing processing of step S1202.

FIG. 14 is a flowchart showing new WSD port/icon generation processing (step S1202) in FIG. 12 in this embodiment. First, a new port/icon generation module 411 acquires all ports and all icons registered in the PC 101 (steps S1401 and S1402). After steps S1401 and S1402, the new port/icon generation module 411 executes a new WSD port/icon generation API (step S1403). The new port/icon generation module 411 determines whether a reply from the new WSD port/icon generation API indicates a success or a failure (step S1404).

If the reply from the new WSD port/icon generation API indicates a failure (NO in step S1404), the new port/icon generation module 411 judges that the WSD icon generation has failed (step S1405), and then ends the processing shown in FIG. 14. On the other hand, if the reply from the new WSD port/icon generation API indicates a success (YES in step S1404), the new port/icon generation module 411 acquires all ports registered in the PC 101 again (step S1406).

When all ports registered in the PC 101 are acquired, the new port/icon generation module 411 determines whether the number of ports acquired in step S1406 is larger than the number of ports acquired in step S1401 (step S1407). If the number of ports acquired in step S1406 is not larger than the number of ports acquired in step S1401 (that is, the number of ports has not increased) (NO in step S1407), the new port/icon generation module 411 executes unnecessary WSD icon deletion processing shown in FIG. 15 to be described later (step S1408). After completion of the unnecessary WSD icon deletion processing, the new port/icon generation module 411 judges that the WSD icon generation has failed (step S1405). After that, the processing shown in FIG. 14 is ended.

On the other hand, if the number of ports acquired in step S1406 is larger than the number of ports acquired in step S1401 (that is, the number of ports has increased) (YES in step S1407), the process advances to step S1409. The new port/icon generation module 411 attempts to acquire a UUID set to the newly generated new WSD port and determines whether the acquisition has succeeded or failed (step S1409). If acquisition of the UUID of the newly generated new WSD port has failed (NO in step S1409), the new port/icon generation module 411 judges that the WSD icon generation has failed (step S1405), and then ends the processing shown in FIG. 14.

On the other hand, if acquisition of the UUID of the newly generated new WSD port has succeeded (YES in step S1409), the process advances to step S1410. The new port/icon generation module 411 determines whether the UUID of the new WSD port acquired in step S1409 matches the UUID of the device held in step S804 (step S1410). If the UUID of the new WSD port acquired in step S1409 does not match the UUID of the device held in step S804 (NO in step S1410), the new port/icon generation module 411 judges that the WSD icon generation has failed (step S1405). After step S1405, the new port/icon generation module 411 ends the processing shown in FIG. 14.

On the other hand, if the UUID of the new WSD port acquired in step S1409 matches the UUID of the device held in step S804 (YES in step S1410), the new port/icon generation module 411 judges that the WSD icon generation has succeeded (step S1411). After step S1411, the new port/icon generation module 411 ends the processing shown in FIG. 14.

Figure 15:
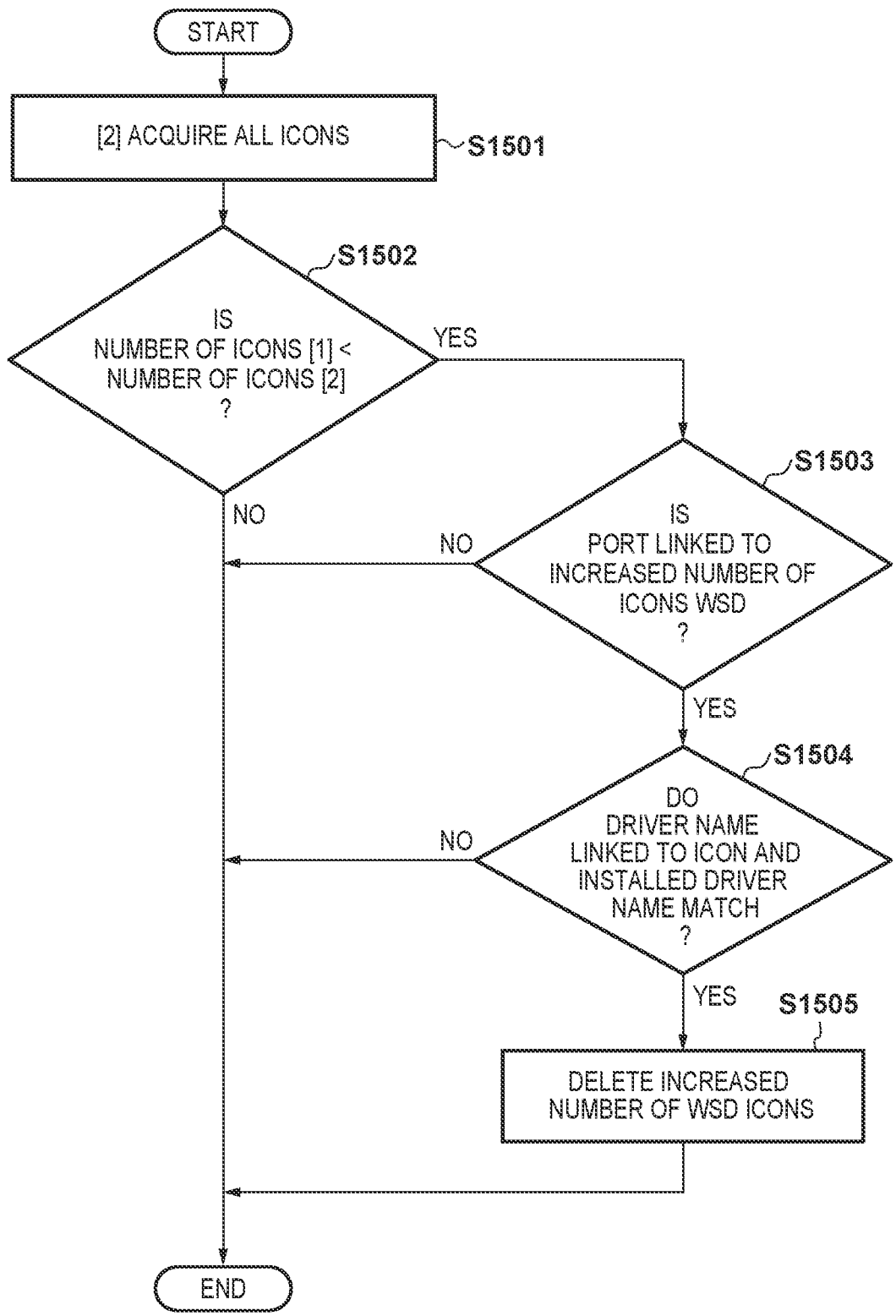
FIG. 15 is a flowchart showing processing of step S1408.

FIG. 15 is a flowchart showing unnecessary WSD icon deletion processing (step S1408) in FIG. 14. First, the new port/icon generation module 411 acquires all icons registered in the PC 101 (step S1501). The new port/icon generation module 411 determines whether the number of icons acquired in step S1501 is larger than the number of icons acquired in step S1402 (step S1502). If the number of icons acquired in step S1501 is not larger than the number of icons acquired in step S1402 (that is, the number of icons has not increased) (NO in step S1502), the new port/icon generation module 411 ends the processing shown in FIG. 15. On the other hand, if the number of icons acquired in step S1501 is larger than the number of icons acquired in step S1402 (that is, the number of icons has increased) (YES in step S1502), the process advances to step S1503. The new port/icon generation module 411 determines whether the port linked with the newly generated new icon is WSD (step S1503).

If the port linked with the new icon is not WSD (NO in step S1503), the new port/icon generation module 411 ends the processing shown in FIG. 15. On the other hand, if the port linked with the new icon is WSD (YES in step S1503), the new port/icon generation module 411 determines whether a driver name linked with the new icon matches the name of the driver installed in step S705 (step S1504).

If the driver name linked with the new icon does not match the name of the driver installed in step S705 (NO in step S1504), the new port/icon generation module 411 ends the processing shown in FIG. 15. On the other hand, if the driver name linked with the new icon matches the name of the driver installed in step S705 (YES in step S1504), the new port/icon generation module 411 deletes the new icon (step S1505), and then ends the processing shown in FIG. 15.

As described above, according to this embodiment, it is possible to prevent a plurality of function icons (for example, for WSD and TCP/IP) port from being generated redundantly. Also, in this embodiment, after the WSD icon is deleted, a TCP/IP icon is generated in the processing shown in FIG. 12. However, another processing may be executed to prevent two FAX icons for the WSD port and the TCP/IP port from being generated. For example, only a print icon may be generated without deleting the FAX WSD icon generated in step S1403 and generating a FAX icon at the time of TCP/IP icon generation.

Also, in this embodiment, after the new WSD port/icon generation API is executed in step S1403, all icons registered in the PC 101 are acquired in step S1501. At this time, the following configuration may be employed. For example, if the WSD icon is not immediately generated because of the low-spec PC 101, after waiting for a predetermined time, all icons may be acquired in step S1501. In addition, if the number of icons has no change at the time of icon count determination of step S1502 (that is, NO in step S1502), the icon count determination processing of step S1502 may be repeated for a predetermined time. With this configuration, it is possible to perform appropriate determination in consideration of the processing time of the PC concerning icon generation processing.

Third Embodiment

The third embodiment will be described below concerning points different from the first and second embodiments. In the first and second embodiments, after new WSD icon generation API execution processing (steps S1302 and S1403), it is determined whether a new WSD icon has been normally generated, as described above. In this embodiment, before the new WSD icon generation API is executed, it is determined whether a WSD port that impedes new WSD icon generation remains.

Figure 16:
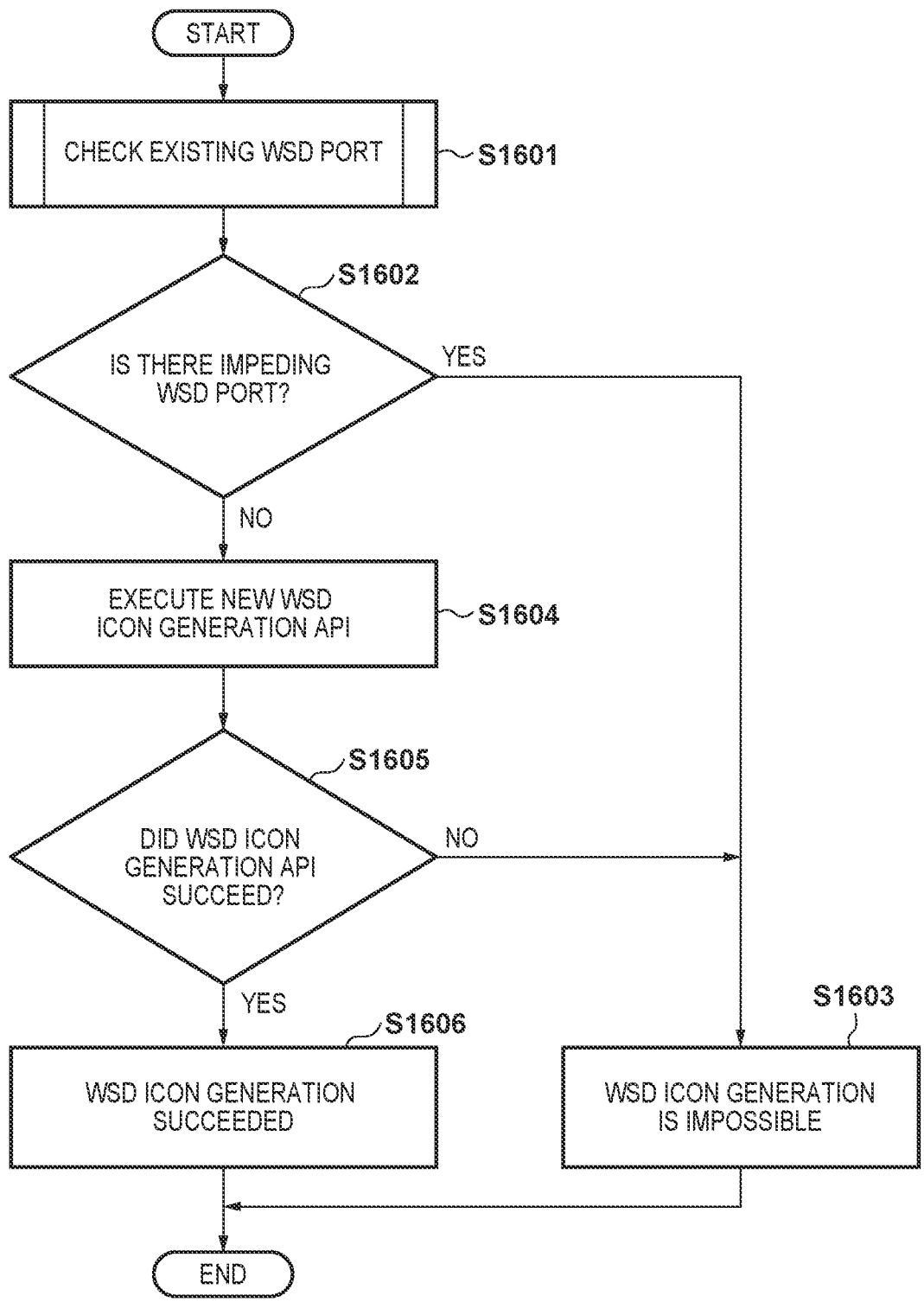
FIG. 16 is a flowchart showing processing of step S1202.

FIG. 16 is a flowchart showing new WSD port/icon generation processing (step S1202) in FIG. 12 according to this embodiment. First, a new port/icon generation module 411 executes existing WSD port check processing shown in FIG. 17, in which it is determined whether an existing WSD port that impedes new WSD port/icon generation is registered in a PC 101 (step S1601). The new port/icon generation module 411 then determines whether an existing WSD port that impedes new WSD port/icon generation is detected from the PC 101 (step S1602).

If an existing WSD port that impedes new WSD port/icon generation is detected from the PC 101 (YES in step S1602), the new port/icon generation module 411 judges that a new WSD port cannot be generated (step S1603), and then ends the processing shown in FIG. 16. On the other hand, if an existing WSD port that impedes new WSD port/icon generation is not detected from the PC 101 (NO in step S1602), the new port/icon generation module 411 executes new WSD icon generation API execution processing (step S1604). The new port/icon generation module 411 determines whether a reply from the new WSD port/icon generation API indicates a success or a failure (step S1605).

If the reply from the new WSD icon generation API indicates a failure (NO in step S1605), the new port/icon generation module 411 judges that new WSD icon generation is impossible (step S1603), and then ends the processing shown in FIG. 16. On the other hand, if the reply from the new WSD icon generation API indicates a success (YES in step S1605), the new port/icon generation module 411 judges that new WSD icon generation has succeeded (step S1606), and then ends the processing shown in FIG. 16. After step S1603, in step S1203 of FIG. 12, it may be determined that the new WSD port/icon generation has failed.

Figure 17:
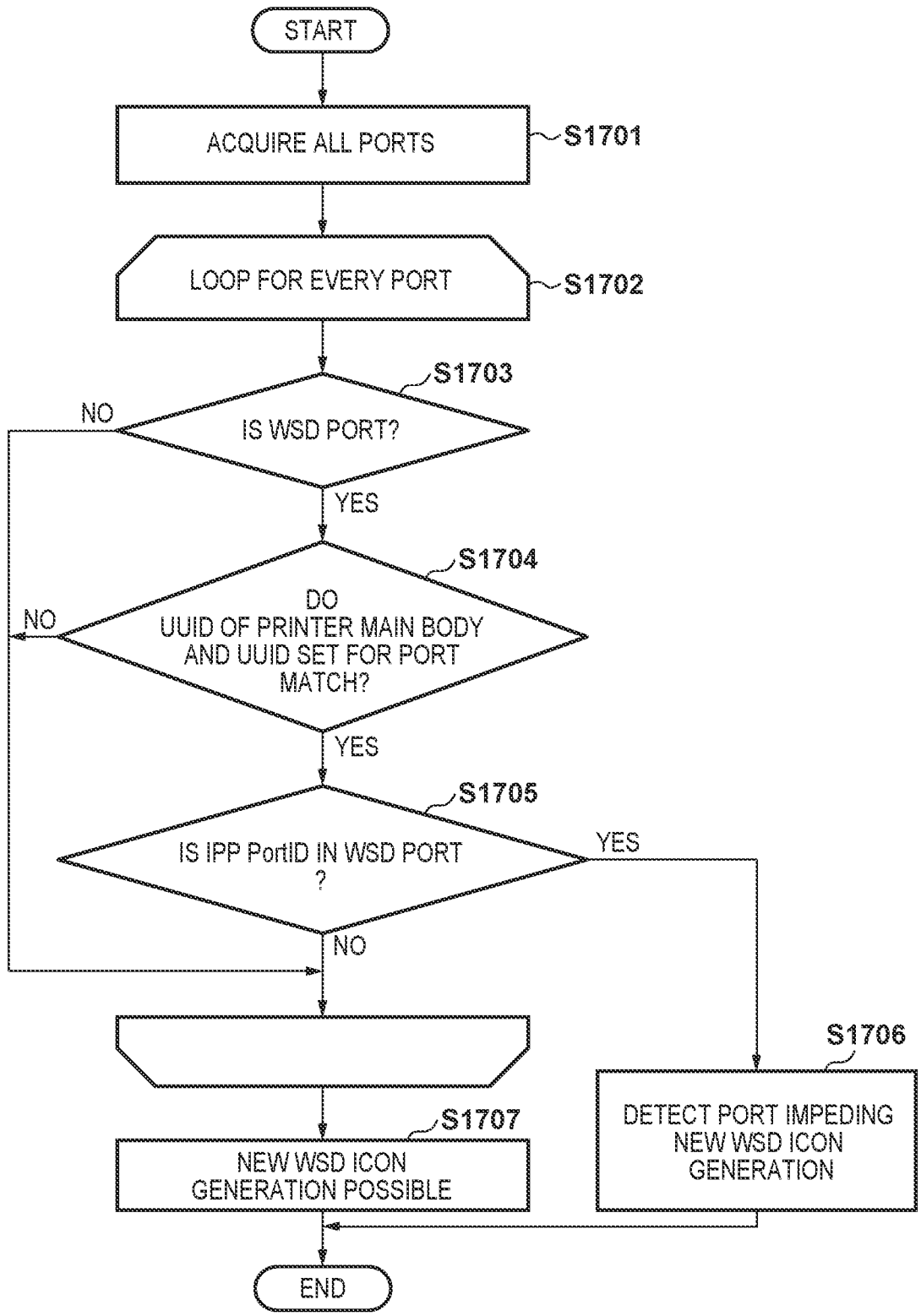
FIG. 17 is a flowchart showing processing of step S1601.

FIG. 17 is a flowchart showing existing WSD port check processing (step S1601) in FIG. 16. First, the new port/icon generation module 411 acquires all ports registered in the PC (step S1701). Then, the new port/icon generation module 411 starts loop processing for checking the presence/absence of a WSD port that impedes new WSD icon generation in the acquired ports (step S1702).

In the loop processing, first, the new port/icon generation module 411 determines whether the check target port that is the target of the loop processing is a WSD port (step S1703). If the check target port is not a WSD port (NO in step S1703), the new port/icon generation module 411 switches the check target port to another port and repeats the loop processing. On the other hand, if the check target port is a WSD port (YES in step S1703), the process advances to step S1704. The new port/icon generation module 411 determines whether a UUID set to the check target port matches the UUID of the device held in step S804 (step S1704).

If the UUID set to the check target port does not match the UUID of the device held in step S804 (NO in step S1704), the new port/icon generation module 411 switches the check target port to another port and repeats the loop processing. On the other hand, if the UUID set to the check target port matches the UUID of the device held in step S804 (NO in step S1704), the process advances to step S1705. The new port/icon generation module 411 determines whether an IPP PortID is set to the check target port (S1705).

If an IPP PortID is not set to the check target port (NO in S1705), the new port/icon generation module 411 switches the check target port to another port and repeats the loop processing. On the other hand, if an IPP PortID is set to the check target port (YES in S1705), the process advances to step S1706. The new port/icon generation module 411 judges that the communication port is a WSD port that impedes new WSD icon generation (step S1706), and then ends the processing shown in FIG. 17. That is, in step S1706, it is judged that an existing WSD port that impedes new WSD port/icon generation is detected from the PC 101. On the other hand, if the loop processing is ended without advancing to step S1706, the new port/icon generation module 411 judges that new WSD icon generation is possible (step S1707), and then ends the processing shown in FIG. 17. That is, in step S1707, it is judged that an existing WSD port that impedes new WSD port/icon generation is not detected from the PC 101.

As described above, according to this embodiment, before the new WSD icon generation API is executed, the new port/icon generation module 411 can determine whether a WSD port that impedes new WSD icon generation remains. Hence, if a WSD port remains, the processing of the new WSD icon generation API is skipped. It is therefore possible to improve the processing efficiency of the application 401.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-128509, filed Jul. 29, 2020, which is hereby incorporated by reference herein in its entirety.

What is claimed is:

1. An information processing apparatus capable of communicating with a device, comprising:
at least one memory storing instructions; and
at least one processor that, upon executing stored instructions, functions as
a first generation unit configured to generate an icon;
a second generation unit configured to generate an icon;
an installation unit configured to install a driver corresponding to the device;
an acquisition unit configured to acquire a number of ports registered in the information processing apparatus before and after an icon generation process is executed by the first generation unit; and
a control unit configured to generate, if the number of ports acquired by the acquisition unit has not increased as compared to before the execution of the icon generation process, by the second generation unit, an icon corresponding to the driver installed by the installation unit.

2. The apparatus according to claim 1, wherein based on a fact that when the icon generation is executed by the first generation unit, the number of ports acquired by the acquisition unit has increased as compared to before the execution, the control unit does not generate, by the second generation unit, the icon corresponding to the driver installed by the installation unit.

3. The apparatus according to claim 1, wherein the at least one processor further executes stored instructions to function as a port determination unit configured to determine whether a newly generated port satisfies a condition, and
wherein
if it is determined by the port determination unit that the newly generated port does not satisfy the condition, the control unit generates, by the second generation unit, the icon corresponding to the driver installed by the installation unit.

4. The apparatus according to claim 3, wherein the condition includes matching between information set to the newly generated port and information of the device.

5. The apparatus according to claim 1, wherein the at least one processor further executes stored instructions to function as an icon determination unit configured to determine presence/absence of an icon that satisfies a condition among icons acquired from the icons registered in the information processing apparatus, and
wherein if it is determined by the icon determination unit that the icon that satisfies the condition is absent, the control unit generates, by the second generation unit, the icon corresponding to the driver installed by the installation unit.

6. The apparatus according to claim 5, wherein the condition includes at least one of a condition concerning the driver and a condition concerning the port.

7. The apparatus according to claim 6, wherein the condition concerning the driver includes matching between a driver name corresponding to the icon and a driver name of the driver.

8. The apparatus according to claim 6, wherein the condition concerning the port includes matching between a type of the port corresponding to the icon and a type of a port generated in correspondence with the device.

9. The apparatus according to claim 5, wherein if it is determined by the icon determination unit that the icon that satisfies the condition is present, the control unit does not perform the icon generation by the first generation unit, and uses the icon that satisfies the condition as the icon corresponding to the driver installed by the installation unit.

10. The apparatus according to claim 1, further comprising a deletion unit configured to delete the icon in a case in which even if the icon generation is executed by the first generation unit, the number of ports acquired by the acquisition unit has not increased as compared to before the execution, and icons are generated in correspondence with a plurality of port types for a function provided in the device.

11. The apparatus according to claim 1, wherein the at least one processor further executes stored instructions to function as a second port determination unit configured to determine presence/absence of a port that satisfies a condition before the icon generation by the first generation unit is executed instead of acquisition of the number of ports by the acquisition unit,
wherein if it is determined by the second port determination unit that the port that satisfies the condition is present, the control unit generates, by the second generation unit, the icon corresponding to the driver installed by the installation unit, and if it is determined by the second port determination unit that the port that satisfies the condition is absent, the control unit does not generate, by the second generation unit, the icon corresponding to the driver installed by the installation unit.

12. The apparatus according to claim 11, wherein the condition includes a predetermined communication port type.

13. The apparatus according to claim 1, wherein the first generation unit generates an icon corresponding to a WSD (Web service on Devices) port.

14. The apparatus according to claim 1, wherein the second generation unit generates an icon corresponding to a TCP/IP port.

15. The apparatus according to claim 1, wherein the driver installed by the installation unit is a driver provided from a manufacturer of the device.

16. A control method executed in an information processing apparatus capable of communicating with a device, comprising:
installing a driver corresponding to the device;
acquiring a number of ports registered in the information processing apparatus before and after an icon generation process is executed by a first generation unit configured to generate an icon; and
generating, if the number of ports acquired in the acquiring has not increased as compared to before the execution of the icon generation process, by a second generation unit configured to generate an icon, an icon corresponding to the installed driver.

17. A non-transitory computer-readable storage medium storing a program configured to cause a computer to perform a control method for an information processing apparatus, the program causing the computer to function to:
install a driver corresponding to a device;
acquire a number of ports registered in the information processing apparatus before and after an icon generation process is executed by a first generation unit configured to generate an icon; and
generate, if the number of ports acquired by the acquiring has not increased as compared to before the execution of the icon generation process, by a second generation unit configured to generate an icon, an icon corresponding to the installed driver.

* * * * *